US012687943B2

(12) United States Patent
Kim et al.

(10) Patent No.: US 12,687,943 B2
(45) Date of Patent: Jul. 21, 2026

(54) TOUCH SENSOR AND TOUCH INPUT DEVICE THEREOF

(71) Applicant: HiDeep Inc., Seongnam-si (KR)

(72) Inventors: Bonkee Kim, Seongnam-si (KR);
Seyeob Kim, Seongnam-si (KR);
Young Ho Cho, Seongnam-si (KR);
Yunjoung Kim, Seongnam-si (KR)

(73) Assignee: HiDeep Inc. (KR)

( * ) Notice: Subject to any disclaimer, the term of this
patent is extended or adjusted under 35
U.S.C. 154(b) by 0 days.

(21) Appl. No.: 18/633,890

(22) Filed: Apr. 12, 2024

(65) Prior Publication Data

US 2024/0345674 A1    Oct. 17, 2024

(30) Foreign Application Priority Data

Apr. 14, 2023    (KR) ......................... 10-2023-0049607

(51) Int. Cl.
*G06F 3/041* (2006.01)
*G06F 3/044* (2006.01)

(52) U.S. Cl.
CPC ............ *G06F 3/0416* (2013.01); *G06F 3/044*
(2013.01); *G06F 2203/04112* (2013.01)

(58) Field of Classification Search
None
See application file for complete search history.

(56) References Cited

U.S. PATENT DOCUMENTS

2017/0300168 A1* 10/2017 Wu ..................... G06F 3/04182
2023/0152924 A1*  5/2023 Jeong .................. G06F 3/04182
                                          345/174

FOREIGN PATENT DOCUMENTS

JP        2014186535 A    10/2014
KR     1020120076025 A     7/2012
KR       102499519 B1     2/2023

* cited by examiner

*Primary Examiner* — Stephen T. Reed
(74) *Attorney, Agent, or Firm* — The Belles Group, P.C.

(57)    ABSTRACT

A touch sensor minimizing the total number of channels for
the touch sensor and a width of a bezel. The touch input
device having a portrait shape in which a vertical length is
greater than a horizontal length according to an embodiment
includes: a touch sensor including a plurality of first elec-
trodes arranged in the vertical direction and a plurality of
second electrodes arranged in the horizontal direction; and a
control unit electrically connected to the plurality of first
electrodes and the plurality of second electrodes to control
the touch sensor. The second electrode includes a pair of
electrodes, one of the pair of electrodes of the second
electrode is disposed adjacent to at least one electrode of the
plurality of first electrodes, and the other of the pair of
electrodes of the second electrode is disposed adjacent to at
least one remaining electrode of the plurality of first elec-
trodes.

13 Claims, 10 Drawing Sheets

TOUCH SENSOR AND TOUCH INPUT DEVICE THEREOF

CROSS-REFERENCE TO RELATED APPLICATIONS

This U.S. non-provisional patent application claims priority under 35 U.S.C. § 119 of Korean Patent Application No. 10-2023-0049607, filed on Apr. 14, 2023, the entire contents of which are hereby incorporated by reference herein, for all purposes.

BACKGROUND

An embodiment of the present invention relates to a touch sensor and a touch input device thereof, and more particularly, to a touch sensor capable of minimizing the total number of channels for the touch sensor and a width of a bezel and a touch input device thereof.

Various kinds of input devices are used to operate a computing system. For example, the input devices include a button, a key, a joystick, and a touch screen. Since the touch screen is easily and simply operated, the touch screen is increasingly used when operating the computing system.

A touch sensor that is one kind of information input devices may be provided in a display panel. For example, the touch sensor may be attached to one surface of the display panel or integrated with the display panel. A user may input information by touching the touch sensor while seeing an image displayed on a screen of the display panel.

FIG. 1 is a schematic view illustrating a laminated structure of a typical OCTA method.

The OCTA that is one kind of touch screen panel technologies stands for On Cell Touch AMOLED and is one kind of touch screen panels (TSP) obtained by directly depositing the touch sensor on an AMOLED display cell as illustrated in FIG. 1. That is, the OCTA is a technology of applying a touch screen function of a smartphone/tablet into an OLED panel. Since no tempered glass is used between the cell and the touch sensor, clarity is improved compared with a typical general TSP.

Y-OCTA is a touch screen panel obtained by directly depositing the touch sensor on the cell. The Y-OCTA is named by adding Y of 'YOUM' that is a brand name of Samsung display flexible OLED to the 'OCTA'. The Y-OCTA technology is applied to a thin film encapsulation (TFE) process among OLED manufacturing processes. A touch screen is realized by patterning an aluminum metal mesh sensor used as a touch sensor between a polarizer and an organic material for thin film encapsulation. The Y-OCTA may solve a visibility limitation occurring at a curved edge by attaching the polarizer close to a cover window. Also, a thickness of the panel may be reduced by removing a support film, and costs may be reduced by omitting a laminating process.

A touch input device including a typical Y-OCTA touch screen panel has a limitation in a low ground mass (LGM) situation. The limitation is a phenomenon in which a signal that is normally detected by the touch input device is disappeared or detected at two or more points, when a predetermined touch occurs in a state (floating state) in which a user does not hold, by hands, the touch input device to which the touch sensor is mounted, in case of realizing a driving electrode and a receiving electrode of the touch sensor as a single layer or a double layer.

SUMMARY

The present disclosure provides a touch input device capable of minimizing the total number of channels for a touch sensor.

The present disclosure also provides a touch input device capable of minimizing a width of a bezel.

An embodiment of the present invention provides a touch input device having a portrait shape in which a vertical length is greater than a horizontal length, including: a touch sensor including a plurality of first electrodes arranged in the vertical direction and a plurality of second electrodes arranged in the horizontal direction; and a control unit electrically connected to the plurality of first electrodes and the plurality of second electrodes to control the touch sensor, in which the second electrode includes a pair of electrodes, one of the pair of electrodes of the second electrode is disposed adjacent to at least one electrode of the plurality of first electrodes, and the other of the pair of electrodes of the second electrode is disposed adjacent to at least one remaining electrode of the plurality of first electrodes.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
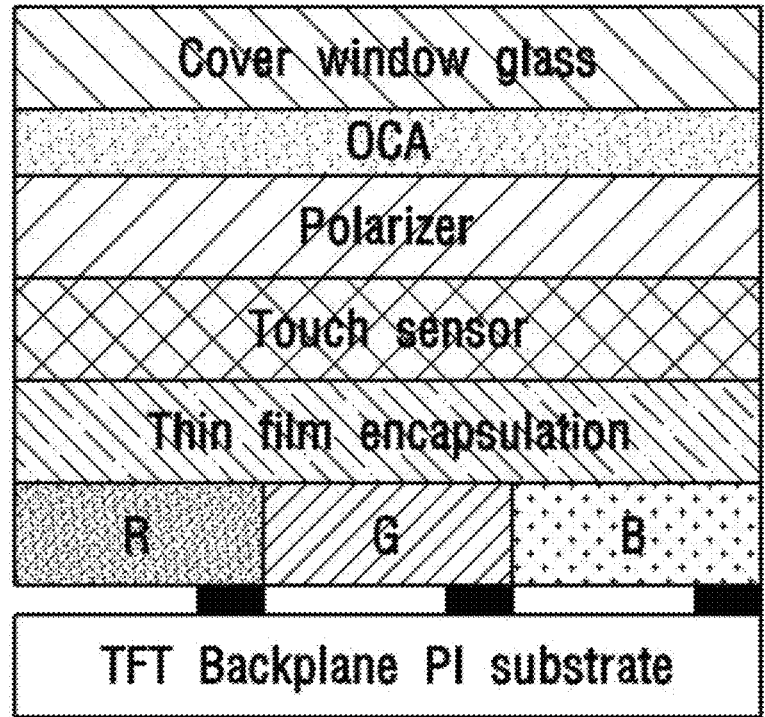
FIG. 1 is a schematic view illustrating a laminated structure of a typical OCTA method.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

A touch input device according to various embodiments of the present document, which is an electronic device, may include at least one of, e.g., a smartphone, a tablet personal computer (PC), a display device for a vehicle, a mobile phone, a video phone, an e-book reader, a laptop personal computer (laptop PC), a netbook computer, a mobile medical device, a camera, or a wearable device. Here, the wearable device may include at least one of an accessory device (e.g., a watch, a ring, a bracelet, an anklet, a necklace, glasses, contact lenses, or a head-mounted-device (HMD)), a fabric or integrated garment (e.g., electronic clothing), a body attachable (e.g., a skin pad or tattoo), and a bio-implantable device (e.g., an implantable circuit).

Figure 2:
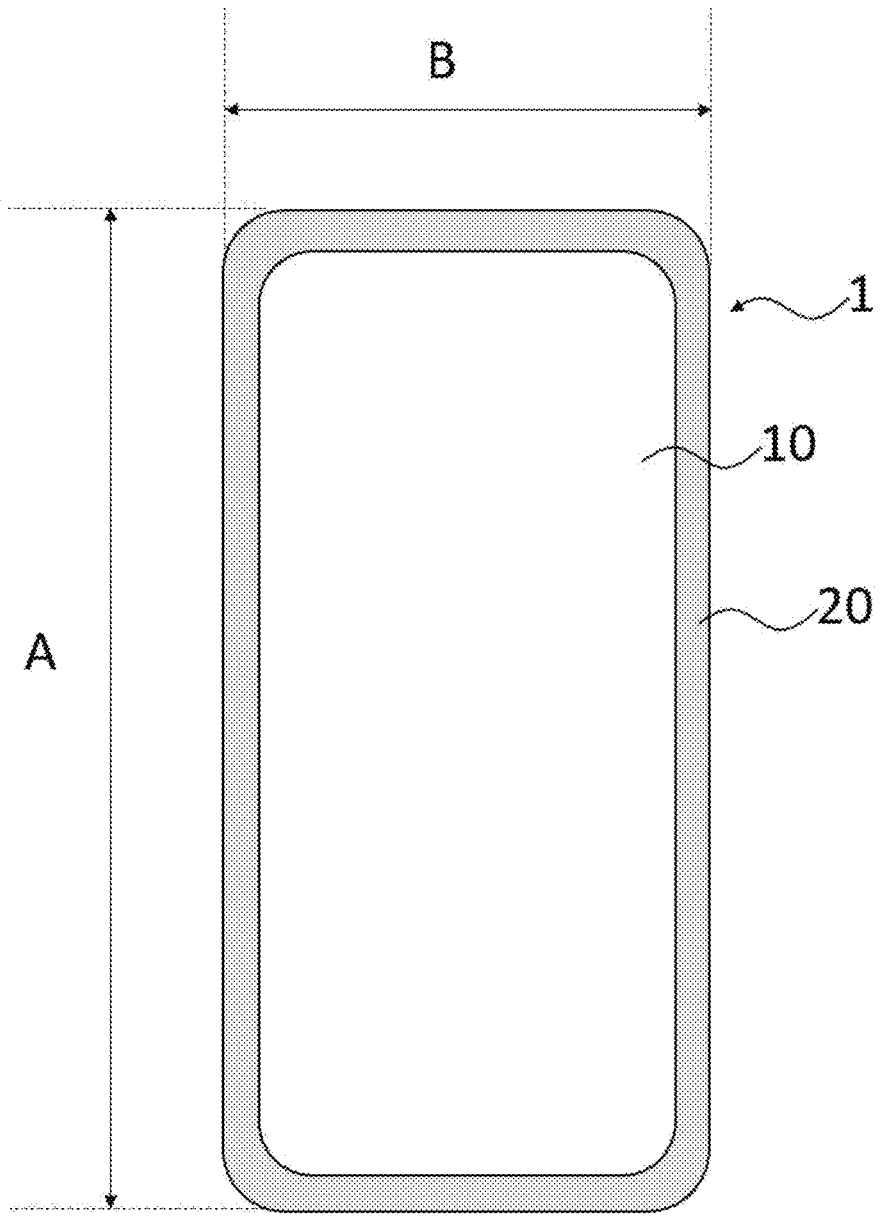
FIG. 2 is a front view illustrating a touch input device 1 according to an embodiment of the present invention.

FIG. 2 is a front view illustrating a touch input device 1 according to an embodiment of the present invention.

Referring to FIG. 2, the touch input device 1 has a front surface having a portrait shape. That is, the touch input device 1 has a first length A in a vertical direction and a second length B in a horizontal direction, and the first length A is greater than the second length B.

The touch input device 1 includes a display panel 10. The display panel may include a touch screen panel illustrated in FIG. 1.

A bezel part 20 may be disposed on the front surface of the touch input device 1. Since the touch input device 1 has a limited front area, a width or an entire area of the bezel part 20 is required to be reduced in order to increase a display screen of the display panel 10.

Figure 3:
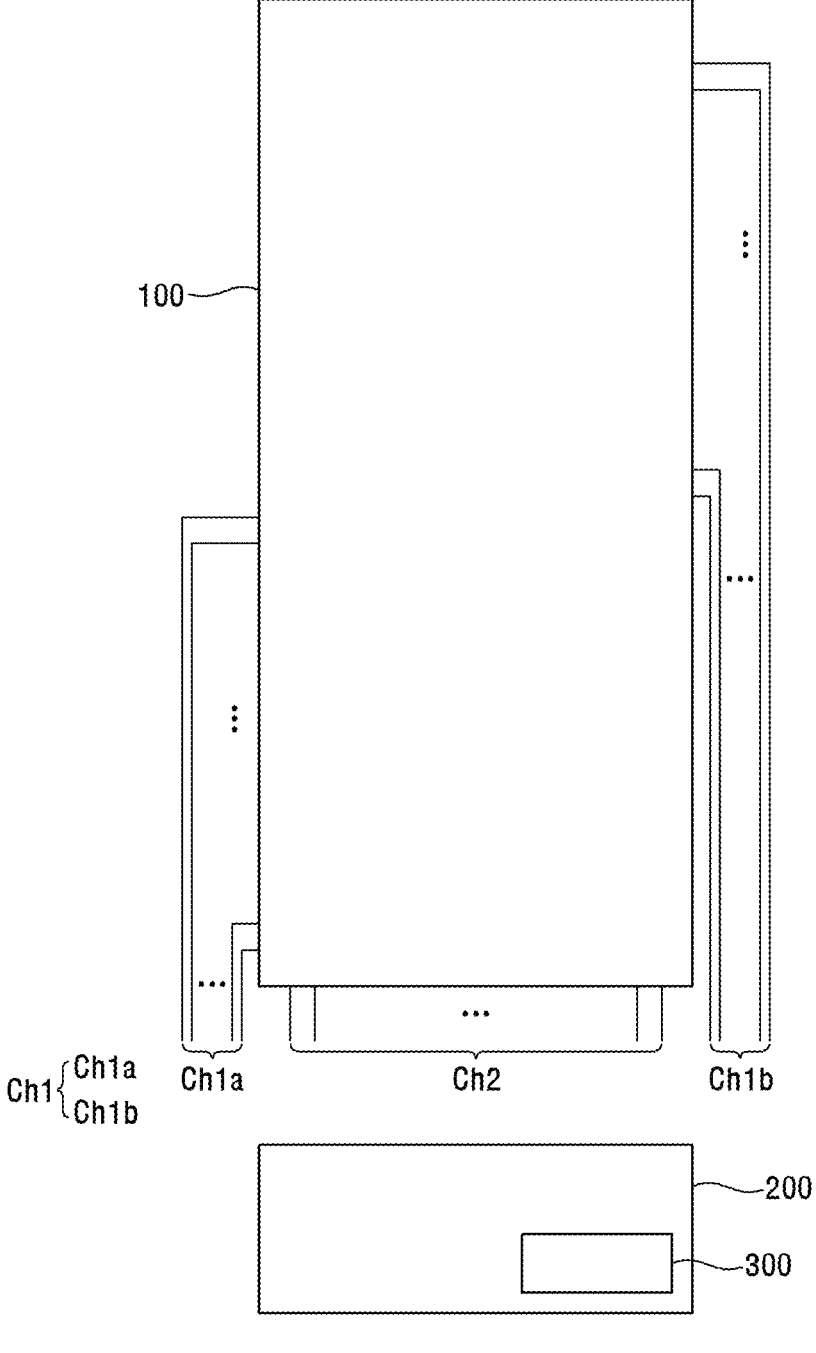
FIG. 3 is a schematic block diagram illustrating the touch input device according to an embodiment of the present invention.

FIG. 3 is a schematic block diagram illustrating the touch input device according to another embodiment of the present invention.

Referring to FIG. 3, the touch input device according to an embodiment of the present invention includes a touch sensor 100, a substrate 200, and a control unit 300.

The touch sensor 100 includes a plurality of electrodes (or patterns). The touch sensor 100 may sense whether an object disposed on the front surface of the touch input device 1 illustrated in FIG. 2 and/or a touch position by using the plurality of electrodes. The plurality of electrodes may be used as two kinds of electrodes. One kind of electrodes may be used as a driving electrode to which a driving signal is applied. The other kind of electrodes may be used as a receiving electrode from which a sensing signal is output.

The touch sensor 100 may have a plurality of channels Ch1 and Ch2. The plurality of channels Ch1 and Ch2 may one-to-one correspond to the plurality of electrodes. Here, each channel may include one electrode and at least one conductive trace connected to the one electrode.

The touch sensor 100 may have a portrait shape corresponding to the portrait shape of the touch input device 1 illustrated in FIG. 2. Thus, the plurality of channels Ch1 and Ch2 of the touch sensor 100 may include first channels Ch1 arranged in a major axis direction (or vertical direction) and second channels Ch2 arranged in a minor axis direction (or horizontal direction).

Due to the portrait shape of the touch sensor 100, the number of first channels Ch1 is greater than the number of second channels Ch2. The number of first channels Ch1 may be greater than one times to three times of the number of second channels Ch2. Here, the number of first channels Ch1 and the number of second channels Ch2 may be varied according to the portrait shape of the touch input device 1 illustrated in FIG. 2.

The first channels Ch1 may include first-a channels Ch1a and first-b channels Ch1b. The first-a channels Ch1a may be disposed on one side, and the first-b channels Ch1b may be disposed on the other side of both sides in a horizontal direction of the touch sensor 100. The first channels Ch1 are distinguished into the first-a channels Ch1a and the first-b channels Ch1b in order to reduce the width of the bezel part 20 of the touch input device illustrated in FIG. 1. This is because the width of the bezel part 20 is difficult to be reduced when the first channels Ch1 are disposed on one side of both the sides in the horizontal direction of the touch sensor 100.

In order to reduce the width of the bezel part 20, the total number of first channels Ch1 and second channels Ch2 may be minimized. When the total number of first channels Ch1 and second channels Ch2 is minimized, in case of realizing the control unit 300 as an integrated circuit (IC), the number of pins of the integrated circuit may be reduced.

The touch sensor 100 may be disposed on a base substrate (not shown). The plurality of electrodes of the touch sensor 100 and at least one conductive trace connected to each thereof may be disposed on the base substrate (not shown). Here, the base substrate (not shown) may be one component of the display panel 10 illustrated in FIG. 1.

The substrate 200 is electrically connected to the touch sensor 100. The substrate 200 may be electrically connected to the plurality of channels Ch1 and Ch2 of the touch sensor 100. The substrate 200 may be in contact with and electrically connected to the base substrate (not shown) on which the touch sensor 100 is disposed.

The substrate 200 may be disposed at a lower end side of the touch sensor 100 having the portrait shape. Alternatively, although not shown in the drawing, the substrate 200 may be disposed at an upper end side of the touch sensor 100. The above-described arrangement may allow the touch sensor 100 to be disposed relatively closer to the second channel Ch2 than the first channel Ch1. The width of the bezel part 20 at left and right edges of the touch input device illustrated in FIG. 2 may be limited depending on the number of first channels Ch1.

The substrate 200 may be a flexible substrate. The substrate 200 may be bent or curved in the touch input device 1 illustrated in FIG. 1 so that at least a portion of the substrate 200 is disposed behind the display panel 10. Accordingly, the control unit 300 disposed on the substrate 200 may be also disposed behind the display panel 10.

The control unit 300 may be disposed on one portion of the substrate 200. Wires that electrically connect the plurality of channels Ch1 and Ch2 of the touch sensor 100 and the control unit 300 may be disposed on the substrate 200. Through the wires, the control unit 300 may apply a driving signal to the touch sensor 100 or receive a sensing signal.

The control unit 300 controls the touch sensor 100.

The control unit 300 applies a driving signal (or Tx signal) to electrodes used as driving electrodes (Tx electrodes) of the touch sensor 100 and receives a sensing signal (or Rx signal) from electrodes used as receiving electrodes (Rx electrodes) of the touch sensor 100.

The control unit 300 may sequentially supply a driving signal to the plurality of driving electrodes of the touch sensor 100 or simultaneously supply a predetermined driving signal to at least two driving electrodes among the plurality of driving electrodes. The former is called as a sequential driving method, and the latter is called as a multi-driving method.

The control unit 300 receives a sensing signal output from the plurality of receiving electrodes of the touch sensor 100. Here, the sensing signal may include information on capacitance variation between the receiving electrode and the driving electrode adjacent thereto, a low ground mass (LGM) noise signal, and a display noise signal.

The control unit 300 may perform analog-to-digital conversion on the sensing signal output from the plurality of receiving electrodes to output a digital sensing signal.

The control unit 300 may output two differential signals among the signals output from the plurality of receiving electrodes and perform analog-to-digital conversion on the output differential signals. To this end, the control unit 300 may include a comparator and an ADC. The control unit 13 may detect whether a touch is generated and/or a touch position based on the digital signal output from the control unit 300.

In FIG. 3, the control unit 300 may be realized as one module, unit, or chip. However, the embodiment of the present invention is not limited thereto. For example, the control unit 300 may be divided into a sensing part that receives a sensing signal from the receiving electrode of the touch sensor 100, a driving part that applies a driving signal to the driving electrode of the touch sensor 100, and a control part that controls the sensing part and the driving part. Alternatively, at least two of the sensing part, driving part, and control part may be realized as one module, unit, or chip.

Although not shown, the touch input device in FIG. 3 may include a display panel (not shown). The touch sensor 100 may be disposed on a cell of the display panel as with the OCTA method illustrated in FIG. 1 or disposed in the cell of the display panel as with an in-cell method. Depending on cases, the touch sensor 100 may be disposed below the display panel. For example, the touch sensor 100 may be directly formed on an outer surface (e.g., a top surface of an upper substrate or a bottom surface of a lower substrate) or an inner surface (e.g., a bottom surface of the upper substrate or a top surface of the lower substrate) of the upper substrate and/or the lower substrate of the display panel. The touch sensor 100 may be coupled to the display panel to constitute a touch screen panel (TSP).

A plurality of scan lines (or gate lines) and a plurality of data lines may be disposed on the display panel. A subpixel may be disposed in an area in which the scan line crosses the data line.

The display panel may include an active area on which a plurality of subpixels are disposed and an inactive area disposed outside the active area. The active area may constitute a display screen of the touch input device. The display screen may have a rectangular shape in which a vertical length is greater than a horizontal length.

The touch input device illustrated in FIG. 3 may include a gate driving circuit, a data driving circuit, and a display control unit for driving various signal lines disposed on the display panel in order to drive the display panel.

The gate driving circuit may be controlled by the display control unit and control a driving timing of the plurality of subpixels by sequentially outputting a display scan signal to the plurality of scan lines disposed on the display panel.

The data driving circuit may receive image data from the display control unit and convert the image data into an analog type data voltage. The data driving circuit may control each subpixel to emit brightness according to the image data by outputting the data voltage (Vdata) to each data line in accordance with a timing when the scan signal is applied through the scan line.

The display control unit may supply various control signals to the gate driving circuit and the data driving circuit and control operations of the gate driving circuit and the data driving circuit. The display control unit may be provided separately from or integrated with the control unit 300 in FIG. 3.

Referring again to FIG. 3, the touch sensor 100 includes the plurality of electrodes (or a plurality of sensors) each having a predetermined shape, and the predetermined electrodes include a plurality of first electrodes and a plurality of second electrodes. Here, when the driving signal is applied to the plurality of first electrodes, the plurality of first electrodes may be the plurality of driving electrodes, and the plurality of second electrodes may be the plurality of receiving electrodes.

Figure 4:
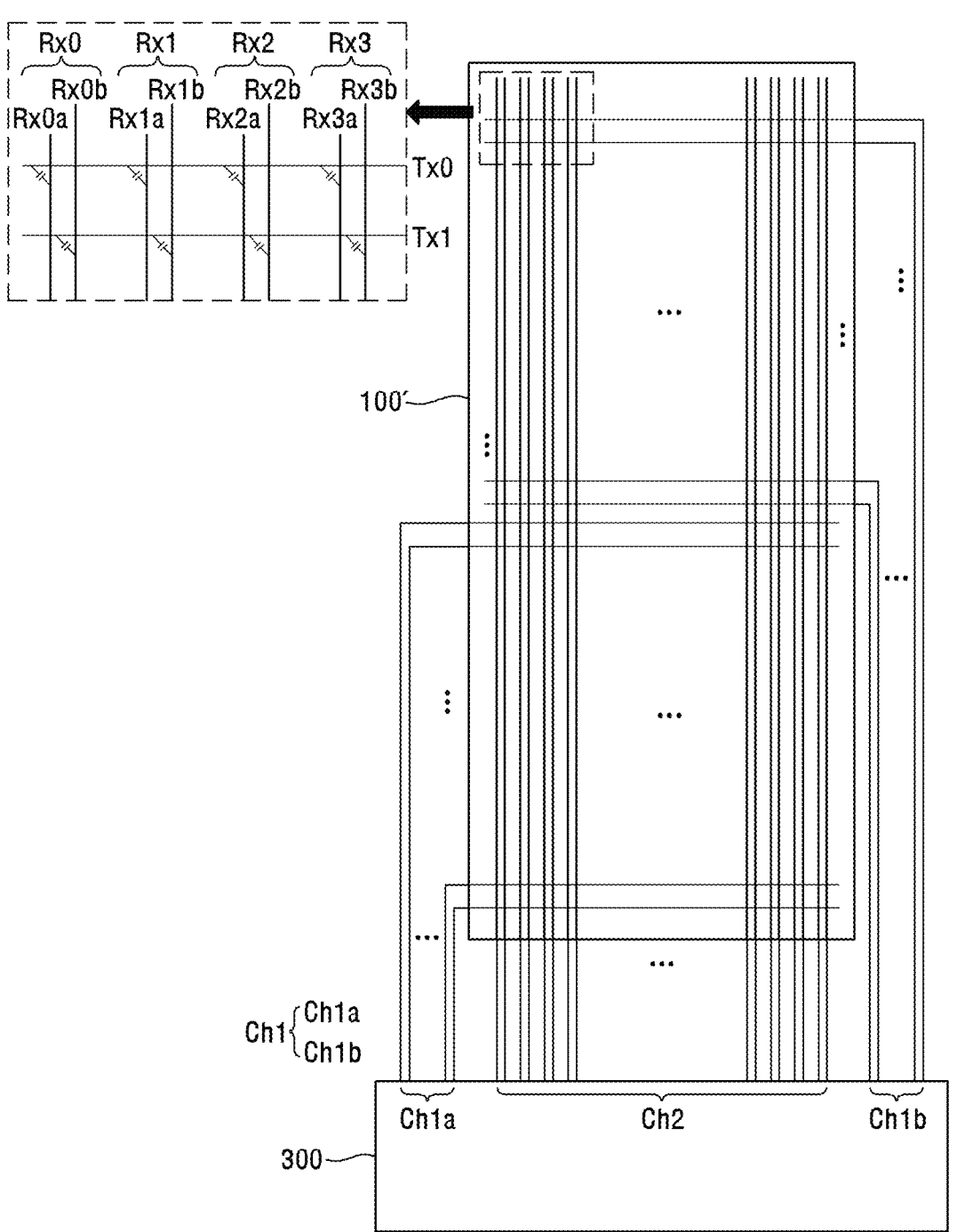
FIG. 4 is a view for explaining a touch sensor 100' according to an embodiment of the touch sensor 100 illustrated in FIG. 3.

FIG. 4 is a view for explaining a touch sensor 100' according to an embodiment of the touch sensor 100 illustrated in FIG. 3. Referring to FIG. 4, the touch sensor 100' includes a plurality of electrodes Tx0, Tx1, Rx0, Rx1, Rx2, and Rx3. . . . The plurality of electrodes Tx0, Tx1, Rx0, Rx1, Rx2, and Rx3 may include a plurality of driving electrodes Tx0, Tx1 . . . and a plurality of receiving electrodes Rx0, Rx1, Rx2, Rx3. . . . The plurality of driving electrodes Tx0, Tx1 . . . and the plurality of receiving electrodes Rx0, Rx1, Rx2, Rx3 . . . may be arranged to intersect each other. A predetermined mutual capacitance Cm may be formed between the plurality of driving electrodes Tx0, Tx1 . . . and the plurality of receiving electrodes Rx0, Rx1, Rx2, Rx3 . . . , particularly at an intersection thereof.

The driving electrodes Tx0, Tx1 . . . may each extend in the horizontal direction, and the receiving electrodes Rx0, Rx1, Rx2, Rx3 . . . may each extend in the vertical direction.

Alternatively, the driving electrodes Tx0, Tx1 . . . may each form an electrical path in the horizontal direction, and the receiving electrodes Rx0, Rx1, Rx2, Rx3 . . . may each form an electrical path in the vertical direction.

In the touch sensor 100' illustrated in FIG. 4, each of the driving electrodes Tx0 and Tx1 has a length less than that of each of the receiving electrodes Rx0, Rx1, Rx2, and Rx3. Also, in the touch sensor 100' illustrated in FIG. 4, the number of driving electrodes Tx0 and Tx1 is greater than the number of receiving electrodes Rx0, Rx1, Rx2, and Rx3. This is because the vertical length A is greater than the horizontal length B in the touch input device as illustrated in FIG. 2. For example, the touch input device may be a smartphone.

Each of the plurality of receiving electrodes Rx0, Rx1, Rx2, and Rx3 includes first receiving electrodes Rx0a, Rx1a, Rx2a, Rx3a, . . . and second receiving electrodes Rx0b, Rx1b, Rx2b, Rx3b. . . .

The first receiving electrodes Rx0a, Rx1a, Rx2a, Rx3a . . . may form the mutual capacitance Cm with at least one driving electrode Tx0 of the plurality of driving electrodes Tx0, Tx1 . . . and may form little or no mutual capacitance Cm with at least one remaining driving electrode Tx1. Here, the forming of the little mutual capacitance Cm may represent a mutual capacitance value that is relatively small compared with the mutual capacitance Cm between the partial driving electrode Tx0 and the first receiving electrodes Rx0a, Rx1a, Rx2a, Rx3a. . . .

The second receiving electrodes Rx0b, Rx1b, Rx2b, Rx3b . . . may form the mutual capacitance Cm with the remaining driving electrode Tx1 of the plurality of driving electrodes Tx0, Tx1 . . . and may form little or no mutual capacitance Cm with the partial driving electrode Tx0. Here, the forming of the little mutual capacitance Cm may represent a mutual capacitance value that is relatively small compared with the mutual capacitance Cm between the remaining driving electrode Tx1 and the second receiving electrodes Rx0*b*, Rx1*b*, Rx2*b*, Rx3*b*. . . .

The first receiving electrodes Rx0*a*, Rx1*a*, Rx2*a*, Rx3*a* . . . may be disposed directly adjacent to at least one driving electrode Tx0 of the plurality of driving electrodes Tx0, Tx1 . . . and spaced a predetermined distance from the remaining driving electrode Tx1 instead of being disposed directly next thereto. Here, at least one different electrode may be disposed between the first receiving electrodes Rx0*a*, Rx1*a*, Rx2*a*, Rx3*a* . . . and the remaining driving electrode Tx1. The different electrode may be at least a portion of the partial driving electrode Tx0.

The second receiving electrodes Rx0*b*, Rx1*b*, Rx2*b*, Rx3*b* . . . may be disposed directly adjacent to at least one remaining driving electrode Tx1 of the plurality of driving electrodes Tx0, Tx1 . . . and spaced a predetermined distance from the partial driving electrode Tx0 instead of being disposed directly next thereto. Here, at least one different electrode may be disposed between the second receiving electrodes Rx0*b*, Rx1*b*, Rx2*b*, Rx3*b* . . . and the remaining driving electrode Tx0. The different electrode may be the remaining driving electrode Tx1.

When a predetermined driving signal is applied to at least one of the plurality of driving electrodes Tx0, Tx1 . . . by the control unit 300, the mutual capacitance Cm with the partial driving electrode Tx0 of the plurality of driving electrode Tx0, Tx1 . . . or a first signal is output from the first receiving electrodes Rx0*a*, Rx1*a*, Rx2*a*, Rx3*a* . . . that are disposed directly next thereto. Alternatively, the mutual capacitance Cm is not substantially formed or a second signal is output from the second receiving electrodes Rx0*b*, Rx1*b*, Rx2*b*, Rx3*b* . . . that are not disposed directly next thereto. The control unit 300 may output a third signal by subtracting or differentially amplifying the output first and second signals and detect whether an object is touched and/or a touch position based on the third signal. Here, the first signal includes information on an amount of variation in mutual capacitance caused by the object, a display noise (e.g., Zebra noise), an amount of variation caused by image change, a LGM noise in a floating state, and a cathode re-transmission phenomenon (as a size of a resistance RELVSS of an ELVSS layer increases (i.e., as a GND decreases), a high-frequency signal is also transmitted to the receiving electrode of the touch sensor and added to a main signal). Also, although the information on the amount of variation in mutual capacitance caused by the object exists slightly in the second signal, the information on the amount of the variation in mutual capacitance caused by the object is contained in the rest noise information such as the display noise (e.g., Zebra noise), the amount of variation caused by image change, the LGM noise in the floating state, and the cathode re-transmission phenomenon as much as substantially the same or similar to noise information contained in the first signal. Thus, since the control unit 300 subtracts or differentially amplifies the second signal from the first signal, almost no noise information may exist in the third signal, and the information on the amount of variation in mutual capacitance caused by the object may constitute most of the third signal.

When the driving signal is applied to the remaining driving electrode Tx1 of the plurality of driving electrodes Tx0, Tx1 . . . by the control unit 300, the mutual capacitance Cm is formed with the remaining driving electrode Tx1 or a second signal is output from the second receiving electrodes Rx0*b*, Rx1*b*, Rx2*b*, Rx3*b* . . . that are disposed directly next thereto. Alternatively, the mutual capacitance Cm is not substantially formed with the remaining driving electrode Tx1 or a first signal is output from the first receiving electrodes Rx0*a*, Rx1*a*, Rx2*a*, Rx3*a* . . . that are not disposed directly next thereto. The control unit 300 may output a third signal by subtracting or differentially amplifying the first signal from the output second signal and detect whether an object is touched and/or a touch position based on the third signal. Here, since the second signal contains the information on the amount of variation in mutual capacitance caused by the object information, almost no noise information exists in the third signal, and the information on the amount of variation in mutual capacitance caused by the object may constitute most of the third signal.

The plurality of driving electrodes Tx0, Tx1 . . . and the plurality of receiving electrodes Rx0, Rx1, Rx2, Rx3 . . . may be arranged together on the same layer (1 layer), or may be disposed respectively in different double layers (2 layers). Alternatively, some of the plurality of driving electrodes Tx0, Tx1 . . . may be disposed on a different layer from the others, and some of the plurality of receiving electrodes Rx0, Rx1, Rx2, Rx3 . . . may be disposed on a different layer from the others. The plurality of driving electrodes Tx0, Tx1 . . . and the plurality of receiving electrodes Rx0, Rx1, Rx2, Rx3 . . . may each have a diamond pattern, circular, oval or polygonal shape.

The plurality of driving electrodes Tx0, Tx1 . . . and the plurality of receiving electrodes Rx0, Rx1, Rx2, Rx3 . . . may be made of a metal mesh and patterned on a thin film encapsulation (TFE) layer of the display panel.

The control unit 300 may be electrically connected to the plurality of channels Ch1 and Ch2 of the touch sensor 100' to control the touch sensor 100'. Here, each of the plurality of channels Ch1 and Ch2 may be electrically connected to one of the first and second receiving electrodes Rx0*a*, Rx0*b*, Rx1*a*, Rx1*b*, Rx2*a*, Rx2*b*, Rx3*a*, Rx3*b*. . . .

of the plurality of driving electrodes Tx0, Tx1 . . . and the plurality of receiving electrodes Rx0, Rx1, Rx2, Rx3. . . .

The control unit 300 may be disposed behind the display panel in the touch input device as the substrate 200 illustrated in FIG. 3 is bent or curved.

The control unit 300 may be realized as an integrated circuit. In this case, the number of a plurality of pins one-to-one connected with the plurality of channels Ch1 and Ch2 of the touch sensor 100' may be minimized.

As described above, the touch sensor 100' includes the plurality of driving electrodes Tx0, Tx1 . . . and the plurality of receiving electrodes Rx0, Rx1, Rx2, Rx3 . . . , and here, each of the receiving electrodes includes the first receiving electrodes Rx0*a*, Rx1*a*, Rx2*a*, Rx3*a* . . . and the second receiving electrodes Rx0*b*, Rx1*b*, Rx2*b*, Rx3*b*. . . .

When the touch sensor 100' is included in the touch input device 1 having the portrait shape in which the vertical length A is greater than the horizontal length B as illustrated in FIG. 2. Here, as illustrated in FIG. 4, the plurality of driving electrodes Tx0, Tx1 . . . may be arranged in the vertical direction having a relatively longer length, and the plurality of receiving electrodes Rx0, Rx1, Rx2, Rx3 . . . may be arranged in the horizontal direction having a relatively shorter length. When arranged as described above, the number of the plurality of channels Ch1 and Ch2 of the touch sensor 100' may be minimized. Furthermore, the width of the bezel part disposed on left and right edges of the touch input device illustrated in FIG. 2 may be further reduced.

Minimization of the number of channels and improvement of the width of the bezel part will be explained by comparing FIGS. 4 and 5.

Figure 5:
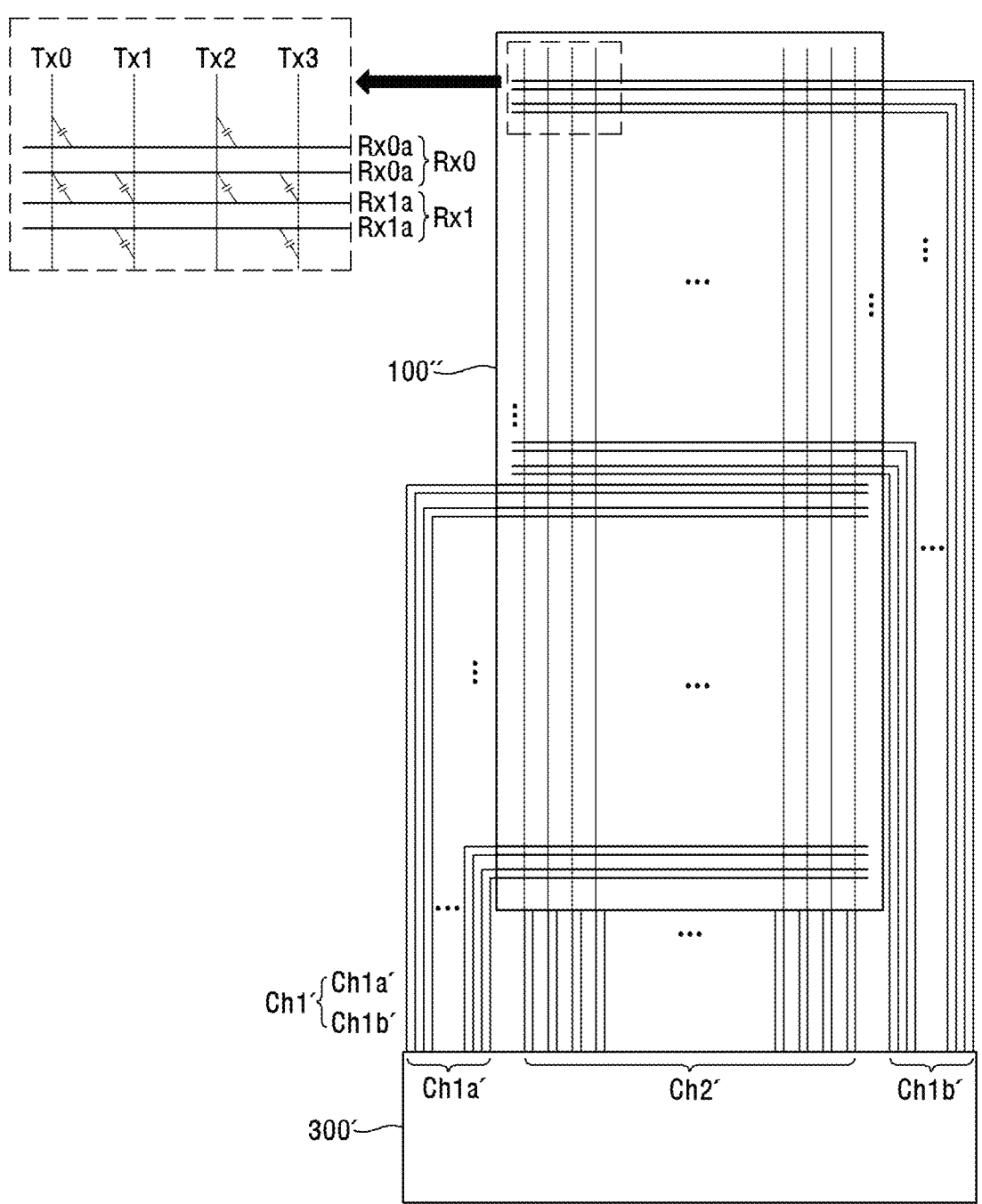
FIG. 5 is a view for explaining a touch sensor 100" used as a comparative object for explaining technical effects of the touch sensor 100' illustrated in FIG. 4.

FIG. 5 is a view for explaining a touch sensor 100" used as a comparative object for explaining technical effects of the touch sensor 100' illustrated in FIG. 4.

The touch sensor 100" illustrated in FIG. 5 has the same configuration as the touch sensor 100' described in FIG. 4, while arrangements of the plurality of driving electrodes and the receiving electrodes are opposite to each other. Specifically, the plurality of driving electrodes Tx0, Tx1, Tx2, Tx3 . . . are arranged in the horizontal direction having a relatively shorter length, and the plurality of receiving electrodes Rx0, Rx1 . . . are arranged in the vertical direction having a relatively longer length.

In FIGS. 4 and 5, it is assumed that the vertical length of the touch sensor 100' having the portrait shape is greater by two times than the horizontal length, and the number of electrodes arranged in the vertical direction is two times of the number of electrodes arranged in the horizontal direction.

Under the above-described assumption, the first channel Ch1 of the touch sensor 100' in FIG. 4 includes the plurality of driving electrodes Tx0, Tx1 . . . , and the second channel Ch2 includes the plurality of receiving electrodes Rx0, Rx1, Rx2, Rx3. . . . Here, when the total number of first channels Ch1 is 40, the number of second channels Ch2 is 40 (=20×2). The number of second channels Ch2 is 40 because each receiving electrode (e.g., Rx0) includes a pair of first and second receiving electrodes Rx0*a* and Rx0*b*. Thus, the total number of channels is 80 (=40+40).

On the other hand, the first channel Ch1' of the touch sensor 100" in FIG. 5 includes the plurality of driving electrodes Rx0, Rx1 . . . , and the second channel Ch2' includes the plurality of receiving electrodes Tx0, Tx1, Tx2, Tx3. . . . Here, when the total number of second channels Ch2' is 20, the number of first channels Ch1'is 80 (=40×2). The number of second channels Ch2' is 80 because each receiving electrode (e.g., Rx0) includes a pair of first and second receiving electrodes Rx0*a* and Rx0*b*. Thus, the total number of channels is 100 (=20+80).

As described above, the total number of channels of the touch sensor 100' of FIG. 4 is less by 20 than the total number of channels of the touch sensor 100" of FIG. 5. Thus, since the number of pins of the control unit 300 for controlling the touch sensor 100' of FIG. 4 may be reduced further than the number of pins of the control unit 300' for controlling the touch sensor 100" of FIG. 5, manufacturing costs of the control unit 300 realized as an integrated circuit may be reduced.

Also, since the number of first channels Ch1 in FIG. 4 is a half of the number of first channels Ch1' in FIG. 5, the number of conductive traces of the first channel Ch1 in FIG. 4 may be reduced by half. Thus, the width of the bezel part disposed on the left and right edges of the touch input device may be further reduced.

On the other hand, the above-described assumption and resulting effects thereof may be applied not only when the vertical length of the touch sensor 100' having the portrait shape is greater than one times and less than two times of the horizontal length, but also when the vertical length is greater than 2 times of the horizontal length. Thus, the embodiment of the present invention is not limited to the feature in which the vertical length of the touch sensor 100' having the portrait shape is two times of the horizontal length.

FIGS. 6 to 9 are view illustrating specific embodiments of the touch sensor 100' illustrated in FIG. 4.

Figure 6:
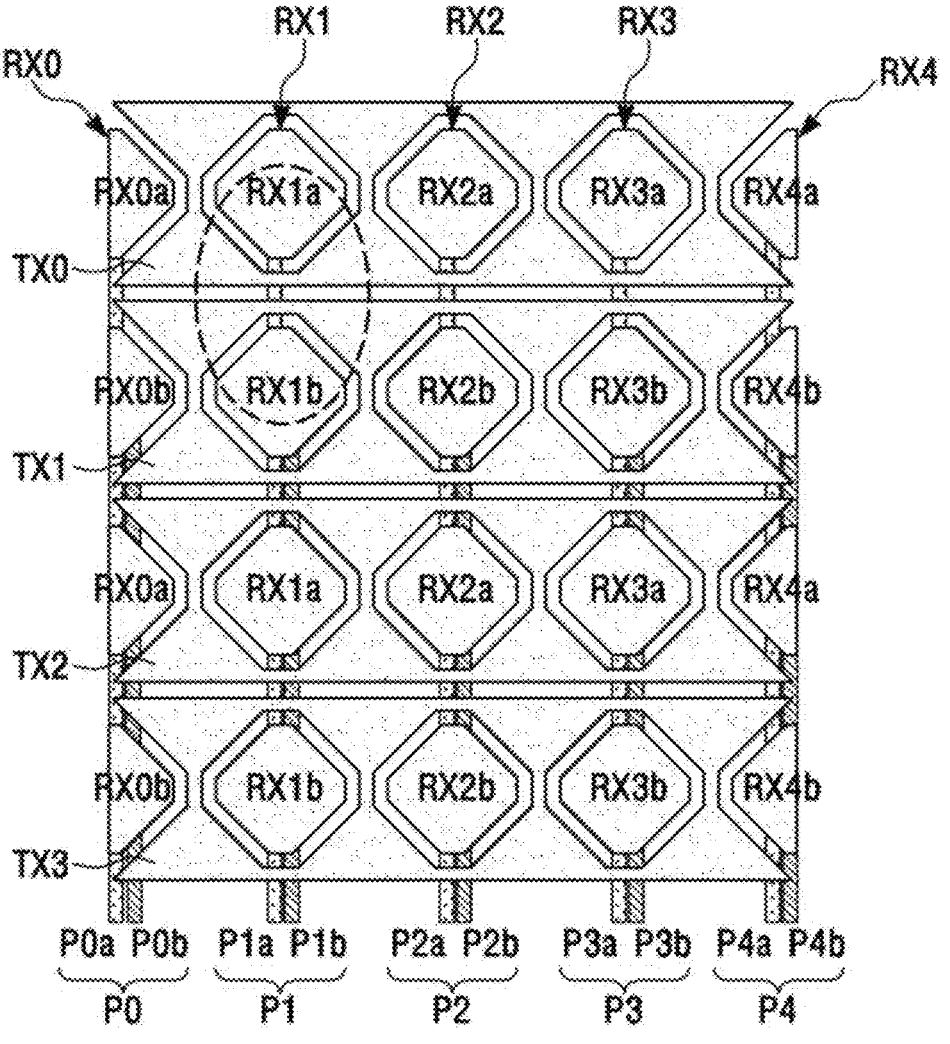
FIGS. 6 to 9 are views illustrating specific embodiments of the touch sensor 100' illustrated in FIG. 4.

FIG. 6 is a plan view illustrating an embodiment of the touch sensor 100' illustrated in FIG. 4.

Referring to FIG. 6, the touch sensor according to an embodiment of the present invention may be disposed on or in the display panel.

The touch sensor according to an embodiment of the present invention includes a plurality of first electrodes and a plurality of second electrodes. Among the plurality of first electrodes and the plurality of second electrodes, electrodes to which the driving signal is applied may serve as the driving electrodes, and the remaining electrodes may serve as the receiving electrodes. Hereinafter, the plurality of first electrodes serve as the plurality of driving electrodes TX0, TX1, TX2, TX3 . . . , and the plurality of second electrodes serve as the plurality of receiving electrodes RX0, RX1, RX2, RX3, RX4. . . .

The plurality of driving electrodes TX0, TX1, TX2, TX3, . . . may include a 0-th driving electrode TX0, a first driving electrode TX1, a second driving electrode TX2, and a third driving electrode TX3. Here, the plurality of driving electrodes TX0, TX1, TX2, TX3 . . . correspond to the plurality of driving electrodes Tx0, Tx1 . . . illustrated in FIG. 4.

The plurality of receiving electrodes RX0, RX1, RX2, RX3, RX4, . . . may include a 0-th receiving electrode RX0, a first receiving electrode RX1, a second receiving electrode RX2, a third receiving electrode RX3, and a fourth receiving electrode RX4. Here, the plurality of receiving electrodes RX0, RX1, RX2, RX3, RX4 . . . correspond to the plurality of receiving electrodes RX0, RX1, Rx2, Rx3 . . . illustrated in FIG. 4.

The plurality of driving electrodes TX0, TX1, TX2, TX3, . . . may be arranged in a second direction (or vertical direction) and each extend in a first direction (or horizontal direction) perpendicular to the second direction. The plurality of receiving electrodes RX0, RX1, RX2, RX3, RX4 . . . may be arranged in the second direction. Alternatively, the plurality of driving electrodes TX0, TX1, TX2, TX3, . . . may be arranged in the first direction (or horizontal direction), and the plurality of receiving electrodes RX0, RX1, RX2, RX3, RX4 . . . , may be arranged in the second direction (or vertical direction).

A predetermined capacitance may be formed between the plurality of driving electrodes TX0, TX1, TX2, TX3, . . . and the plurality of receiving electrodes RX0, RX1, RX2, RX3, RX4. . . . The capacitance is varied when a touch input is generated at a corresponding point or a surrounding thereof. Thus, whether a touch is generated or a touch input may be detected by detecting an amount of variation in capacitance from a signal output from the plurality of receiving electrodes RX0, RX1, RX2, RX3, RX4. . . .

Each of the plurality of driving electrodes TX0, TX1, TX2, TX3 . . . may have a rectangular pattern or bar pattern shape extending in the first direction and have, therein, a plurality of openings O arranged in the first direction.

One receiving electrode may be disposed in each opening O. Each opening O has a shape corresponding to that of the one receiving electrode disposed therein. For example, as illustrated in FIG. 6, the rest except for openings disposed on left and right edges among the plurality of openings O may have a rhombus shape, and the openings disposed on the left and right edges may each have a triangular shape. Although not shown in the drawings, each of the openings O may have a rhombus shape. Also, each of the plurality of openings O may have various shapes such as a polygon, a rectangle, a circle or an oval.

Each of the receiving electrodes RX0, RX1, RX2, RX3, RX4 . . . includes a plurality of receiving electrodes RX0*a*, RX0b, RX1a, RX1b, RX2a, RX2b, RX3a, RX3b, RX4a, and RX4b and connecting patterns P0, P1, P2, P3, and P4. Here, some receiving electrode patterns RX0a, RX1a, RX2a, RX3a, and RX4a among the plurality of receiving electrode patterns RX0a, RX0b, RX1a, RX1b, RX2a, RX2b, RX3a, RX3b, RX4a, and RX4b may correspond to the first receiving electrodes Rx0a, Rx1a, Rx2a, Rx3a . . . in FIG. 4, and the remaining receiving electrode patterns RX0b, RX1b, RX2b, RX3b, and RX4b may correspond to the second receiving electrodes Rx0b, Rx1b, Rx2b, Rx3b . . . in FIG. 4.

The plurality of driving electrodes TX0, TX1, TX2, TX3, . . . and the plurality of receiving electrode patterns RX0a, RX0b, RX1a, RX1b, RX2a, RX2b, RX3a, RX3b, RX4a, and RX4b may be disposed together on a first layer. Here, the plurality of driving electrodes TX0, TX1, TX2, TX3 . . . , and the plurality of receiving electrode patterns RX0a, RX0b, RX1a, RX1b, RX2a, RX2b, RX3a, RX3b, RX4a, and Rx4b, which are disposed on the first layer, may be made of a metal mesh. The plurality of connecting patterns P0a, P0b, P1a, P1b, P2a, P2b, P3a, P3b, P4a, and P4b may be disposed on a second layer. The second layer is different from the first layer and electrically insulated from the first layer. Here, the plurality of connecting patterns P0a, P0b, P1a, P1b, P2a, P2b, P3a, P3b, P4a, and P4b may be made of a metal mesh. The first layer may be disposed on the second layer, and vice versa.

The plurality of receiving electrode patterns contained in each receiving electrode may be divided into at least two groups. The receiving electrode patterns of the other group are alternately arranged between the receiving electrode patterns of one group. The receiving electrode patterns of the one group are electrically separated from the receiving electrode patterns in the another group. Here, the receiving electrode pattern in the one group may be referred to as a first receiving electrode pattern, and the receiving electrode pattern in the another group may be referred to as a second receiving electrode pattern.

The plurality of connection patterns contained in each receiving electrode include first connection patterns that electrically connect the receiving electrode patterns in the one group and second connection patterns that electrically connect the receiving electrode patterns in the another group.

For example, the 0-th receiving electrode RX0 may include the plurality of receiving electrode patterns RX0a and RX0b and the plurality of connection patterns P0. The plurality of receiving electrode patterns RX0a and RX0b may include the receiving electrode patterns RX0a of a first group and the receiving electrode patterns Rx0b of a second group, which are alternately arranged one by one in the second direction. The receiving electrode patterns RX0a of the first group and the receiving electrode patterns RX0b of the second group may be electrically separated from each other. The 0-th connection pattern P0 may include first connection patterns P0a that electrically connect the receiving electrode patterns RX0a of the first group and second connection patterns P0b that electrically connect the receiving electrode patterns RX0b of the second group.

The first receiving electrode RX1 may include the plurality of receiving electrode patterns RX1a and RX1b and the plurality of connection patterns P1. The plurality of receiving electrode patterns RX1a and RX1b may include the receiving electrode patterns RX1a of the first group and the receiving electrode patterns Rx1b of the second group, which are alternately arranged one by one in the second direction. The receiving electrode patterns RX1a of the first group and the receiving electrode patterns RX1b of the second group may be electrically separated from each other. The first connection pattern P1 may include first connection patterns P1a that electrically connect the receiving electrode patterns RX1a of the first group and second connection patterns P1b that electrically connect the receiving electrode patterns RX1b of the second group.

The second receiving electrode RX2 may include the plurality of receiving electrode patterns RX2a and RX2b and the plurality of connection patterns P2. The plurality of receiving electrode patterns RX2a and RX2b may include the receiving electrode patterns RX2a of the first group and the receiving electrode patterns Rx2b of the second group, which are alternately arranged one by one in the second direction. The receiving electrode patterns RX2a of the first group and the receiving electrode patterns RX2b of the second group may be electrically separated from each other. The second connection pattern P2 may include first connection patterns P2a that electrically connect the receiving electrode patterns RX2a of the first group and second connection patterns P2b that electrically connect the receiving electrode patterns RX2b of the second group.

The third receiving electrode RX3 may include the plurality of receiving electrode patterns RX3a and RX3b and the plurality of connection patterns P3. The plurality of receiving electrode patterns RX3a and RX3b may include the receiving electrode patterns RX3a of the first group and the receiving electrode patterns RX3b of the second group, which are alternately arranged one by one in the second direction. The receiving electrode patterns RX3a of the first group and the receiving electrode patterns RX3b of the second group may be electrically separated from each other. The third connection pattern P3 may include first connection patterns P3a that electrically connect the receiving electrode patterns RX3a of the first group and second connection patterns P3b that electrically connect the receiving electrode patterns Rx3b of the second group.

The fourth receiving electrode RX4 may include the plurality of receiving electrode patterns RX4a and RX4b and the plurality of connection patterns P4. The plurality of receiving electrode patterns RX4a and RX4b may include the receiving electrode patterns Rx4a of the first group and the receiving electrode patterns Rx4b of the second group, which are alternately arranged one by one in the second direction. The receiving electrode patterns RX4a of the first group and the receiving electrode patterns RX4b of the second group may be electrically separated from each other. The fourth connection pattern P4 may include first connection patterns P4a that electrically connect the receiving electrode patterns RX4a of the first group and second connection patterns P4b that electrically connect the receiving electrode patterns Rx4b of the second group.

The plurality of receiving electrode patterns RX0a, RX0b, RX1a, RX1b, RX2a, RX2b, RX3a, RX3b, RX4a, and RX4b are disposed in the plurality of openings O of the plurality of driving electrodes TX0, TX1, TX2, TX3. . . . One receiving electrode pattern is disposed in one opening O. Each of the receiving electrode patterns has a shape corresponding to that of the corresponding opening.

In the random receiving electrode RX1, a portion of the driving electrode TX0 directly adjacent to a periphery of the receiving electrode pattern RX1a of the first group and a portion of the driving electrode TX1 directly adjacent to a periphery of the receiving electrode pattern RX1b of the second group are disposed together between the receiving electrode pattern RX1a of the first group and the receiving electrode pattern RX1b of the second group.

The random driving electrode TX0 is disposed directly adjacent to a periphery of the receiving electrode patterns RX0a, RX1a, RX2a, RX3a, and RX4a of one group, and another driving electrode TX1 disposed directly adjacent to a periphery of the receiving electrode patterns RX0a, RX1a, RX2a, RX3a, and RX4a of the other group is separated from the receiving electrode patterns RX0a, RX1a, RX2a, RX3a, and RX4a of one group by the random driving electrode TX0.

Each of the connection patterns P0a, P0b, P1a, P1b, P2a, P2b, P3a, P3b, P4a, and P4b may have a bar pattern shape extending in the second direction and include at least one conductive via v. The conductive via v may be disposed at both ends of each of the connection patterns.

In the 0-th receiving electrode RX0, each of the first connection patterns P0a electrically connects two adjacent receiving electrode patterns RX0a through the conductive via v among the receiving electrode patterns RX0a of the first group and is disposed below the receiving electrode patterns RX0b of the second group, which are disposed between the two adjacent receiving electrode patterns RX0a, to overlap the receiving electrode patterns RX0b of the second group. Each of the second connection patterns P0b electrically connects two adjacent receiving electrode patterns RX0b through the conductive via v among the receiving electrode patterns RX0b of the second group and is disposed below the receiving electrode patterns RX0a of the first group, which are disposed between the two adjacent receiving electrode patterns RX0b of the first group, to overlap the receiving electrode patterns RX0a of the first group. The first connection patterns P1a, P2a, P3a, and P4a and the second connection patterns P1b, P2b, P3b, and P4b of the remaining receiving electrodes RX1, RX2, RX3, and RX4 are disposed in the same manner as described above.

Hereinafter, an operation when a driving signal is applied to at least one of the plurality of driving electrodes TX0, TX1, TX2, and TX3 will be described in detail. For convenience of description, an operation of the first receiving electrode RX1 and an operation of the control unit 300 in FIG. 4 will be described in detail.

When a driving signal is applied to the plurality of driving electrodes TX0, TX1, TX2, and TX3, two sensing signals are output through the first connection pattern P1. A first signal is a signal output through the first connection pattern P1a, and a second signal is a signal output through the second connection pattern P1b. Thus, two channels of first and second signals are output from each of the receiving electrodes RX0, RX1, RX2, RX3, and RX4. The first and second signals are output at the same time from the control unit in FIG. 4.

Depending on the driving electrodes TX0, TX1, TX2, TX3, . . . to which a driving signal is applied, one of the first and second signals may be an active channel signal (or active receiving signal ARX), and the other may be a dummy channel signal (or dummy receiving signal DRX). Specifically, when a driving signal is applied to the driving electrodes TX0 and TX2 on which the receiving electrode patterns RX1a of the first group are arranged, the first signal output through the first connection pattern P1a serve as the active channel signal, and the second signal output through the second connection pattern P1b serve as the dummy channel signal. On the other hand, when a driving signal is applied to the driving electrodes TX1 and/or TX3 on which the receiving electrode patterns RX1b of the second group are arranged, the second signal output through the second connection pattern P1b serves as the active channel signal, and the first signal output through the first connection pattern P1a serves as the dummy channel signal.

For example, as illustrated in FIG. 6, when a driving signal is applied to the first driving electrode TX1 in a state in which an object (dotted line) is close to or in contact with an intersection point of the first driving electrode TX1 and the first receiving electrode RX1, a capacitance (or mutual active capacitance) formed between the first driving electrode TX1 and the receiving electrode pattern RX1b of the second group of the first receiving electrode RX1 is varied. The second signal including information on an amount of variation of the varied capacitance is an active channel signal output through the second connection pattern P1b.

Also, a capacitance (or dummy capacitance) formed between the first driving electrode TX1 and the receiving electrode patterns RX1a of the first group of the first receiving electrode RX1 is also varied. The first signal including information on an amount of variation of the varied capacitance is a dummy channel signal output through the first connection pattern P1a.

The control unit 300 illustrated in FIG. 4 may subtract the first signal output through the first connection pattern P1a from the second signal output through the second connection pattern P1b to cancel all or most of the cathode retransmission noise signal, the LGM noise signal, and the display noise signal input to the receiving electrode pattern Rx1b of the second group and the receiving electrode pattern RX1a of the first group.

Figure 7:
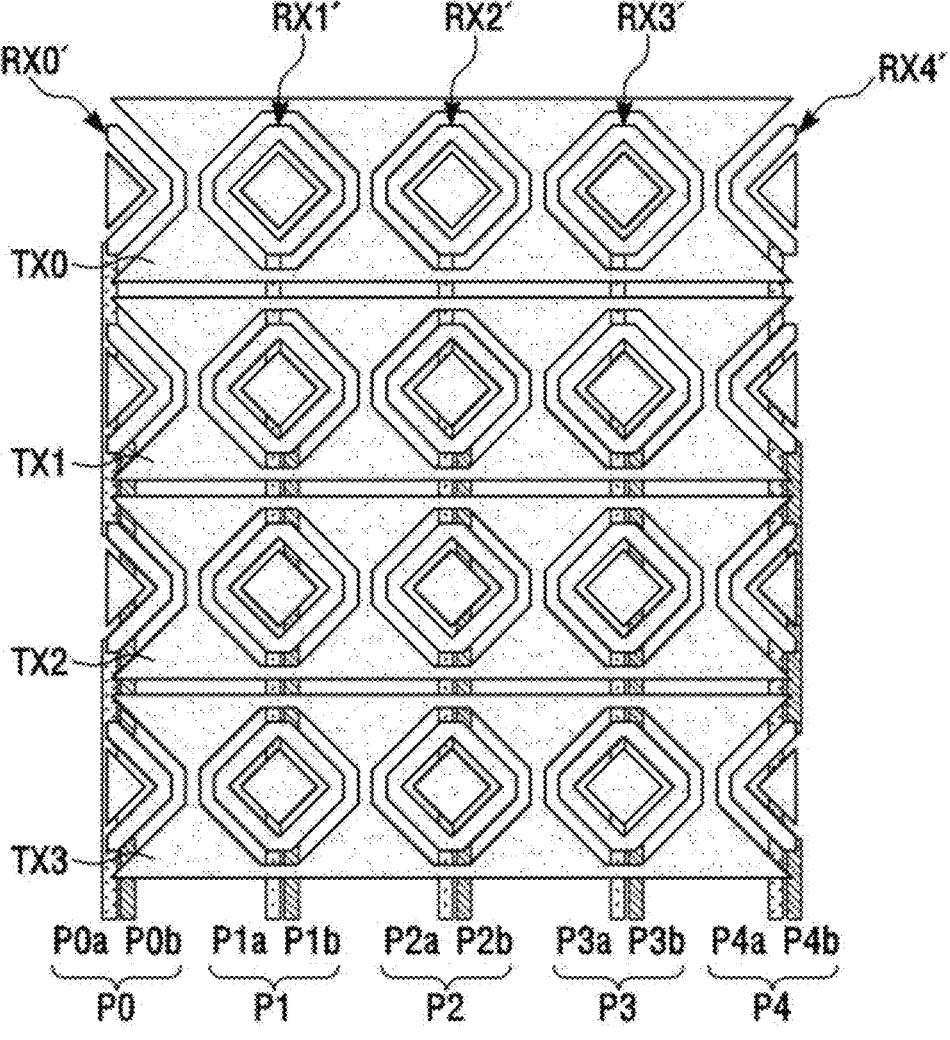

FIG. 7 is a plan view illustrating a portion of another embodiment of the touch sensor 100' in FIG. 4.

The touch sensor according to another embodiment of the present invention illustrated in FIG. 7 is different in a plurality of receiving electrodes RX0', RX1', RX2', RX3', and RX4' from the touch sensor according to an embodiment of the present invention illustrated in FIG. 6. In particular, a plurality of electrode patterns RX1a' contained in each of the receiving electrodes RX0', RX1', RX2', RX3', and RX4' have different structures. Hereinafter, the structures of the plurality of electrode patterns RX1a' will be described in detail, and the rest components will be replaced with those described above.

Each of the plurality of receiving electrode patterns RX1a' contained in each of the receiving electrodes RX0', RX1', RX2', RX3', and RX4' has an opening O' therein and includes a dummy pattern DX1a disposed in the opening O'. Here, the dummy pattern DX1a may have a shape corresponding to the opening O'.

The dummy pattern DX1a is not electrically connected to connection patterns P0a, P0b, P1a, P1b, P2a, P2b, P3a, P3b, P4a, and P4b. The dummy pattern DX1a maintains an electrically floating state.

An operation of the touch sensor illustrated in FIG. 7 according to another embodiment of the present invention is the same as that of the touch sensor illustrated in FIG. 6 according to an embodiment of the present invention. Thus, a touch input device including the touch sensor illustrated in FIG. 7 according to another embodiment of the present invention has an advantage of removing various noises generated during touch sensing, e.g., the display noise and the LGM noise.

Figure 8:
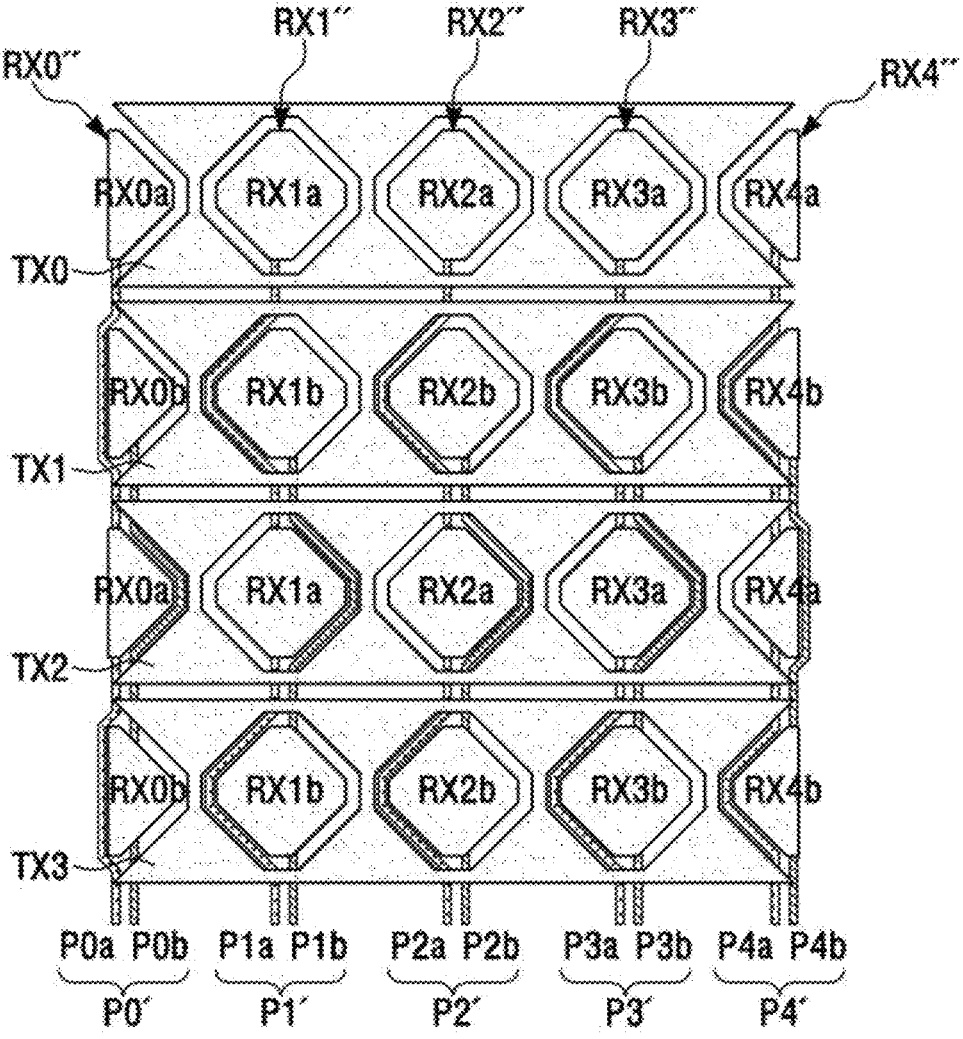

FIG. 8 is a plan view illustrating a portion of another embodiment of the touch sensor 100' in FIG. 4.

The touch sensor illustrated in FIG. 8 according to another embodiment of the present invention is different in a plurality of receiving electrodes RX0", RX1", RX2", RX3", and RX4" from the touch sensor illustrated in FIG. 6 according to an embodiment of the present invention. In particular, a plurality of connection patterns P0', P1', P2', P3', and P4' contained in each of the receiving electrodes RX0", RX1", RX2", RX3", and RX4" have different arrangement structures and shapes. Hereinafter, the arrangement structures and shapes of the connection patterns P0', P1', P2', P3', and P4' will be described in detail, and the rest components will be replaced with those described above.

Each of the connection patterns P0', P1', P2', P3', and P4' includes first connection patterns P0a', P1a', P2a', P3a', and P4a' and second connection patterns P0b', P1b', P2b', P3b', and P4b'.

Each of the first connection patterns P0a', P1a', P2a', P3a', and P4a' electrically connects two receiving electrode patterns RX0a, RX1a, RX2a, RX3a, and RX4a of the first group so as not to overlap the receiving electrode patterns RX0b, RX1b, RX2b, RX3b, and RX4b of the second group disposed between the two receiving electrode patterns. For example, at least a portion of each of the first connection patterns P0a', P1a', P2a', P3a', and P4a' may be disposed between the receiving electrode patterns RX0b, RX1b, RX2b, and Rx3b of the second group and the driving electrodes TX0, TX1, TX2, and TX3 disposed directly adjacent to the receiving electrode patterns RX0b, RX1b, RX2b, and RX3b of the second group so as not to overlap the receiving electrode patterns RX0b, RX1b, RX2b, RX3b, and Rx4b of the second group. Also, the rest portion may be disposed to overlap the driving electrodes TX0, TX1, TX2, and TX3.

Each of the second connection patterns P0b', P1b', P2b', P3b', and P4b' electrically connects two receiving electrode patterns RX0a, RX1a, RX2a, RX3a, and RX4a of the second group so as not to overlap the receiving electrode patterns RX0a, RX1a, RX2a, RX3a, and RX4a of the first group disposed between the two receiving electrode patterns. For example, at least a portion of each of the second connection patterns P0b', P1b', P2b', P3b', and P4b' may be disposed between the receiving electrode patterns RX0a, RX1a, RX2a, RX3a, and RX4a of the first group and the driving electrodes TX0, TX1, TX2, and TX3 disposed directly adjacent to the receiving electrode patterns RX0a, RX1a, RX2a, RX3a, and RX4a of the first group so as not to overlap the receiving electrode patterns RX0a, RX1a, RX2a, RX3a, and Rx4a of the first group. Also, the rest portion may be disposed to overlap the driving electrodes TX0, TX1, TX2, and TX3.

The touch sensor according to another embodiment of the present invention may have an advantage of reducing a capacitance value between the first connection pattern and the receiving electrode patterns of the second group or between the second connection patterns and the receiving electrode patterns of the first group in comparison with the touch sensor in FIG. 6 according to an embodiment of the present invention.

Although not shown in the drawings, the dummy pattern DX1a in FIG. 7 may be applied to the touch sensor according to another embodiment of the present invention.

Figure 9:
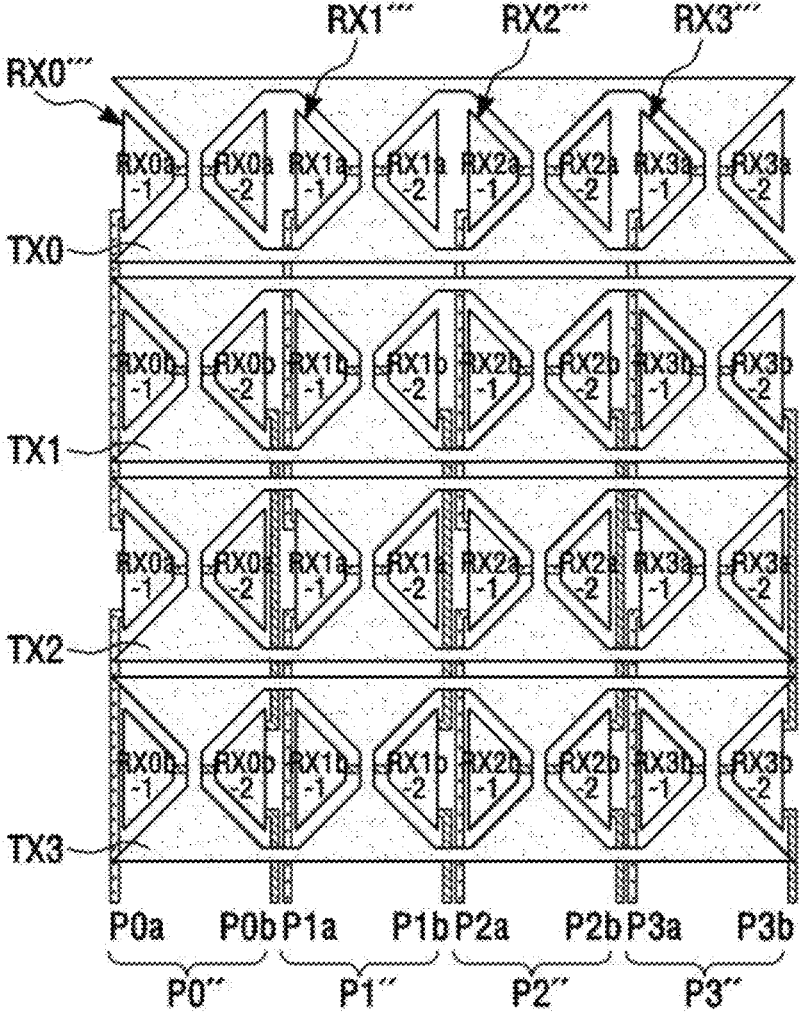

FIG. 9 is a plan view illustrating a portion of another embodiment of the touch sensor 100' in FIG. 4.

The touch sensor illustrated in FIG. 9 according to another embodiment of the present invention is different in a plurality of receiving electrodes RX0''', RX1''', RX2''', and RX3''' from the touch sensor illustrated in FIG. 6 according to an embodiment of the present invention. In particular, a plurality of receiving electrode patterns RX0a-1, RX0a-2, RX0b-1, RX0b-2, RX1a-1, RX1a-2, RX1b-1, RX1b-2, RX2a-1, RX2a-2, RX2b-1, RX2b-2, RX3a-1, RX3a-2, RX3b-1, and RX3b-2 and a plurality of connection patterns P0'', P1'', P2'', and P3'' contained in each of the receiving electrodes RX0''', RX1''', RX2''', and RX3''' have different structures and arrangement shapes. Hereinafter, the structures and arrangement shapes of the receiving electrode patterns RX0a-1, RX0a-2, RX0b-1, RX0b-2, RX1a-1, RX1a-2, RX1b-1, RX1b-2, RX2a-1, RX2a-2, RX2b-1, RX2b-2, RX3a-1, RX3a-2, RX3b-1, and RX3b-2 and the connection patterns PO'', P1'', P2'', and P3'' will be described in detail, and the rest components will be replaced with those described above.

The plurality of receiving electrode patterns RX0a-1, RX0a-2, RX0b-1, RX0b-2, RX1a-1, RX1a-2, RX1b-1, RX1b-2, RX2a-1, RX2a-2, RX2b-1, RX2b-2, RX3a-1, RX3a-2, RX3b-1, and RX3b-2 of each of the receiving electrodes RX0''', RX1''', RX2''', and RX3''' include the receiving electrode patterns RX0a-1, RX0a-2, RX1a-1, RX1a-2, RX2a-1, RX2a-2, RX3a-1, and RX3a-2 of the first group and the receiving electrode patterns RX0b-1, RX0b-2, RX1b-1, RX1b-2, RX2b-1, RX2b-2, RX3b-1, and Rx3b-2 of the second group, which are alternately arranged one by one in the second direction. The receiving electrode patterns RX0a-1, RX0a-2, RX1a-1, RX1a-2, RX2a-1, RX2a-2, RX3a-1, and RX3a-2 of the first group and the receiving electrode patterns RX0b-1, RX0b-2, RX1b-1, RX1b-2, RX2b-1, RX2b-2, RX3b-1, and RX3b-2 of the second group may be electrically separated from each other.

Each of the receiving electrode patterns RX0a-1, RX0a-2, RX1a-1, RX1a-2, RX2a-1, RX2a-2, RX3a-1, and RX3a-2 of the first group includes first receiving electrode patterns RX0a-1, RX1a-1, RX2a-1, and RX3a-1 and second receiving electrode patterns RX0a-2, RX1a-2, RX2a-2, and RX3a-2. The first receiving electrode patterns RX0a-1, RX1a-1, RX2a-1, and RX3a-1 and the second receiving electrode patterns RX0a-2, RX1a-2, RX2a-2, and RX3a-2 are disposed in two openings O adjacent to each other in the first direction in the corresponding driving electrodes TX0 and TX2, respectively. One first or second receiving electrode pattern is disposed in the openings disposed at both side edges among a plurality of openings O of each of the driving electrodes TX0, TX1, TX2, and TX3, and the second receiving electrode pattern of receiving electrode patterns of the first group of one receiving electrode and the first receiving electrode pattern of the receiving electrode patterns of the first group of another receiving electrode are disposed together in the rest openings while being spaced apart from each other among the plurality of receiving electrodes RX0''', RX1''', RX2''', and RX3'''.

Each of the connection patterns P0'', P1'', P2'', and P3'' includes first connection patterns P0a'', P1a'', P2a'', and P3a'' electrically connecting the receiving electrode patterns RX0a-1, RX0a-2, RX1a-1, RX1a-2, RX2a-1, RX2a-2, RX3a-1, and RX3a-2 of the first group and second connection patterns P0b'', P1b'', P2b'', and P3b'' electrically connecting the receiving electrode patterns RX0b-1, RX0b-2, RX1b-1, RX1b-2, RX2b-1, RX2b-2, RX3b-1, and Rx3b-2 of the second group.

Each of the first connection patterns P0a'', P1a'', P2a'', and P3a'' and the second connection patterns P0b'', P1b'', P2b'', and P3b'' are configured and arranged to connect two adjacent receiving electrode patterns for each group with a minimum distance. For example, each of the first connection patterns P0a'', P1a'', P2a'', and P3a'' and the second connection patterns P0b'', P1b'', P2b'', and P3b'' may have one end connected to one side of a lower end of one of two adjacent receiving electrode patterns of one group and the other end connected to one side of an upper end of the other receiving electrode pattern. The rest portion except for the one end and the other end has a shape extending in the second direction and overlaps the opening O of the driving electrode with a maximum cross-sectional area instead of overlapping the receiving electrode pattern of the other group disposed between the one receiving electrode pattern and the other receiving electrode pattern.

Also, each of the first connection patterns P0a", P1a", P2a", and P3a" may further include a receiving connection pattern electrically connecting the first receiving electrode pattern and the second receiving electrode pattern of the receiving electrode pattern of the first group, and each of the second connection patterns P0b", P1b", P2b", and P3b" may further include a receiving connection pattern electrically connecting the first receiving electrode pattern and the second receiving electrode pattern of the receiving electrode pattern of the second group.

The touch sensor according to another embodiment of the present invention may have an advantage of reducing a resistance value of each connection pattern and a capacitance value between the first connection pattern and the receiving electrode pattern of the second group or between the second connection pattern and the receiving electrode pattern of the first group in comparison with the touch sensor in FIG. 6 according to an embodiment of the present invention.

Figure 10:
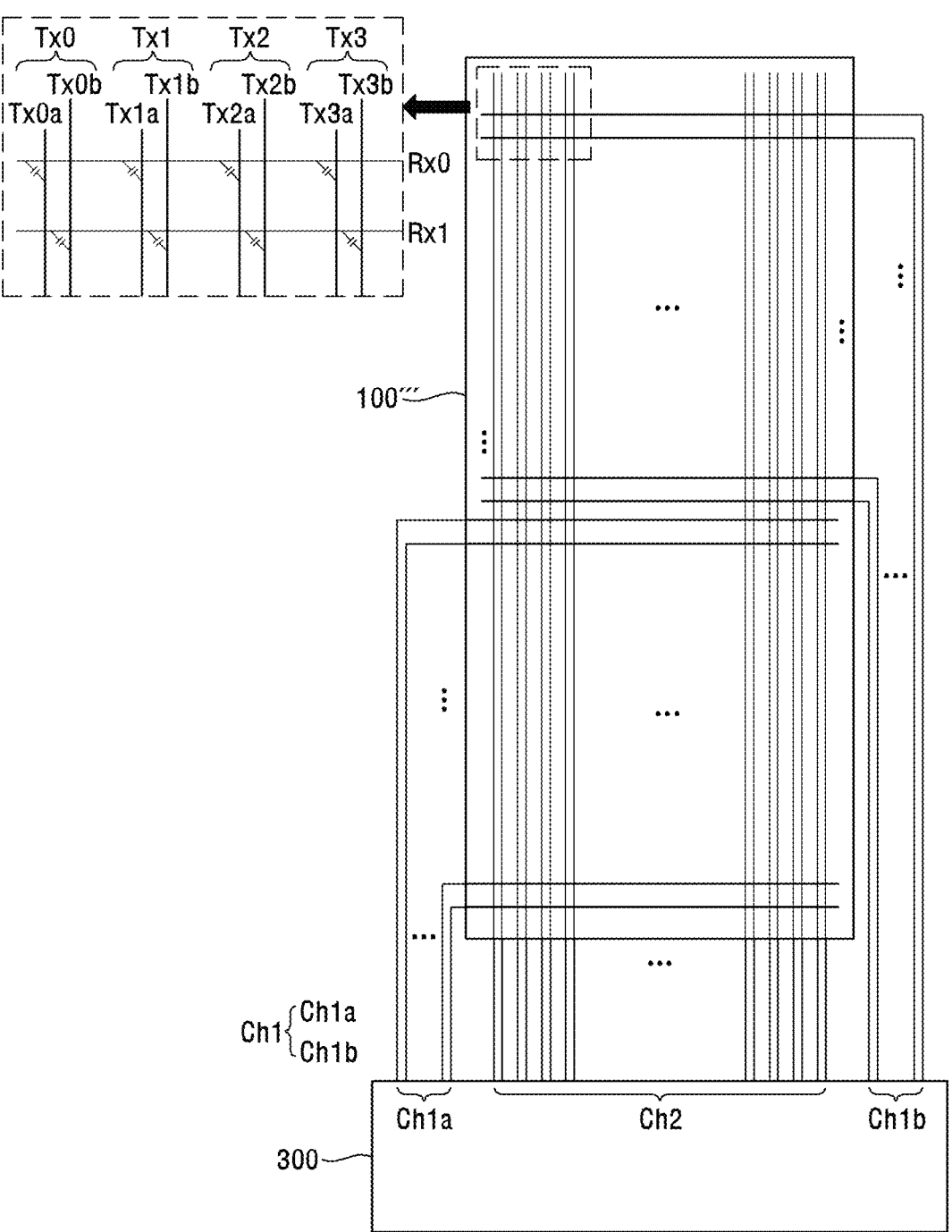
FIG. 10 is a view for explaining a touch sensor 100''' according to another embodiment of the touch sensor 100 illustrated in FIG. 3.

FIG. 10 is a view for explaining a touch sensor 100''' according to another embodiment of the touch sensor 100 illustrated in FIG. 3.

When the touch sensor 100''' illustrated in FIG. 10 is compared with the touch sensor 100' illustrated in FIG. 4, the touch sensor 100''' has a difference in that a plurality of receiving electrodes Rx0, Rx1 . . . are arranged in the vertical direction, and a plurality of driving electrodes Tx0, Tx1, Tx2, Tx3 . . . are arranged in the horizontal direction. Also, each of the driving electrodes Tx0, Tx1, Tx2, Tx3 . . . includes first driving electrodes Tx0a, Tx1a, Tx2a, Tx3a . . . and second driving electrodes Tx0b, Tx1b, Tx2b, Tx3b. . . .

When a vertical length of the touch sensor 100''' having the portrait shape is greater than two times of the horizontal length, and the number of electrodes arranged in the vertical direction is two times of the number of electrodes arranged in the horizontal direction, a first channel Ch1 of the touch sensor 100''' includes a plurality of receiving electrodes Rx0, Rx1 . . . , and a second channel Ch2 includes a plurality of driving electrodes Tx0, Tx1, Tx2, Tx3. . . . Here, when the total number of first channels Ch1 is 40, the number of second channels Ch2 is 40 (=20×2). The number of second channels Ch2 is 40 because each driving electrode (e.g., Tx0) includes a pair of first and second driving electrodes Tx0a and Tx0b. Thus, the total number of channels is 80 (=40+40).

On the contrary to FIG. 10, when the plurality of receiving electrodes Rx0, Rx1 . . . are arranged in the horizontal direction, and the plurality of driving electrodes Tx0, Tx1, Tx2, Tx3 . . . are arranged in the vertical direction, the total number of channels is 100 as described in FIG. 5.

Thus, when the touch sensor 100''' having the portrait shape includes the plurality of driving electrodes Tx0, Tx1, Tx2, Tx3 . . . and the plurality of receiving electrodes Rx0, Rx1 . . . , and each of the driving electrode Tx0, Tx1, Tx2, Tx3 . . . includes the first driving electrodes Tx0a, Tx1a, Tx2a, Tx3a . . . and the second driving electrodes Tx0b, Tx1b, Tx2b, Tx3b . . . , it is advantageous to minimize the number of channels and reduce the width of the bezel that the plurality of receiving electrodes Rx0, Rx1 . . . are arranged in the vertical direction, and the plurality of driving electrodes Tx0, Tx1, Tx2, Tx3 . . . are arranged in the horizontal direction.

When the control unit 300 applies a driving signal to the plurality of driving electrodes Tx0, Tx1, Tx2, Tx3 . . . , the control unit 300 may apply a first driving signal to the first driving electrode Tx0a of each driving electrode (e.g., Tx0) and a second driving signal to the second driving electrode Tx0b at the same time. Here, the second driving signal may be obtained by shifting a phase of the first driving signal by 180°. In this case, a sensing signal including first capacitance information between the first driving electrode Tx0a and the receiving electrode Rx0 and second capacitance information between the second driving electrode Tx0b and the receiving electrode Rx0 from the receiving electrode (e.g., Rx0) adjacent to each driving electrode (e.g., Tx0) may be output. The information may include the second capacitance information subtracted from the first capacitance information or, on the contrary, the first capacitance information subtracted from the second capacitance information.

Since various embodiments of the touch sensor 100''' of FIG. 10 may be obtained by replacing the receiving electrode with the driving electrode and the driving electrode with the receiving electrode in the embodiments of FIGS. 6 to 9, detailed drawings thereof will be omitted.

The total number of channels for the touch sensor may be minimized by using the touch input device according to the embodiment of the present invention.

The width of the bezel may be minimized.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch input device having a portrait shape in which a vertical length is greater than a horizontal length, comprising:

a touch sensor comprising a plurality of first electrodes arranged in the vertical direction and a plurality of second electrodes arranged in the horizontal direction; and a control unit electrically connected to the plurality of first electrodes and the plurality of second electrodes to control the touch sensor, wherein each of the first electrodes consists of a single electrode portion, wherein each of the second electrodes comprises a pair of electrode portions, wherein the pair of electrode portions comprises a second-first electrode portion and a second-second electrode portion that are electrically separated from each other, wherein the second-first electrode portion is configured to be disposed relatively closer to one first electrode of the plurality of first electrodes than the second-second electrode portion, and wherein the second-second electrode portion is configured to be disposed relatively closer to another first electrode of the plurality of first electrodes than the second-first electrode portion.

2. The touch input device of claim 1, wherein the second-first electrode portion is not disposed directly adjacent to the another first electrode of the plurality of first electrodes.

3. The touch input device of claim 1, wherein the first electrode is a driving electrode, and the second electrode is a receiving electrode.

4. The touch input device of claim 1, wherein the first electrode is a receiving electrode, and the second electrode is a driving electrode.

5. The touch input device of claim 1, further comprising a display panel in which the touch sensor is disposed.

6. The touch input device of claim 1, further comprising a display panel disposed on or below the touch sensor.

7. The touch input device of claim 1, wherein the control unit controls a driving signal to be applied to the first electrode and detects a touch position of an object based on a third signal obtained by subtracting or differentially amplifying the first signal output from the second-first electrode portion and the second signal output from the second-second electrode portion.

8. The touch input device of claim 1, wherein the control unit controls a driving signal to be applied to the second electrode and applies the first signal applied to the second-first electrode portion and the second signal applied to the second-second electrode portion at the same time while phases thereof are shifted by 180°.

9. The touch input device of claim 1, wherein each of the plurality of second electrodes comprises electrode patterns of one group and electrode patterns of the other group, which are electrically separated from each other, the electrode patterns of the one group and the electrode patterns of the other group are alternately arranged, each of the plurality of second electrodes comprises a plurality of connection patterns, and the plurality of connection patterns comprise first connection patterns configured to electrically connect the electrode patterns of the one group and second connection patterns configured to electrically connect the electrode patterns of the other group.

10. The touch input device of claim 9, wherein a portion of the first electrode directly adjacent to a periphery of the electrode pattern of the one group and a portion of the first electrode directly adjacent to a periphery of the electrode pattern of the other group are disposed together between the electrode pattern of the one group and the electrode pattern of the other group.

11. The touch input device of claim 9, wherein another first electrode disposed directly adjacent to a periphery of the electrode pattern of the other group is separated from the electrode pattern of the one group by the first electrode disposed directly adjacent to a periphery of the electrode pattern of the one group.

12. The touch input device of claim 9, wherein the first connection pattern is disposed so as not to overlap the electrode patterns of the other group, which are disposed between two electrode patterns connected by the first connection pattern.

13. The touch input device of claim 9, wherein each of the electrode patterns comprises a dummy pattern disposed in an opening defined therein.

*     *     *     *     *